(12) United States Patent
Zhu et al.

(10) Patent No.: US 10,708,600 B2
(45) Date of Patent: Jul. 7, 2020

(54) REGION OF INTEREST DETERMINATION IN VIDEO

(71) Applicant: Arm Limited, Cambridge (GB)

(72) Inventors: Yuhao Zhu, Rochester, NY (US); Paul Nicholas Whatmough, Cambridge, MA (US)

(73) Assignee: Arm Limited, Cambridge (GB)

( * ) Notice: Subject to any disclaimer, the term of this patent is extended or adjusted under 35 U.S.C. 154(b) by 131 days.

(21) Appl. No.: 15/875,464

(22) Filed: Jan. 19, 2018

(65) Prior Publication Data

US 2019/0230367 A1    Jul. 25, 2019

(51) Int. Cl.
| | |
|---|---|
| *H04N 19/167* | (2014.01) |
| *H04N 19/43* | (2014.01) |
| *H04N 21/2343* | (2011.01) |
| *G06N 3/02* | (2006.01) |
| *H04N 21/234* | (2011.01) |

(52) U.S. Cl.
CPC ............ *H04N 19/167* (2014.11); *G06N 3/02* (2013.01); *H04N 19/43* (2014.11); *H04N 21/23418* (2013.01); *H04N 21/234345* (2013.01)

(58) Field of Classification Search
CPC .... G06K 9/00664; G06K 9/3233; G06N 3/08; G06N 3/02; H04N 19/167; H04N 19/43; H04N 21/234345
See application file for complete search history.

(56) References Cited

U.S. PATENT DOCUMENTS

| | | | |
|---|---|---|---|
| 2010/0271515 A1* | 10/2010 | Imagawa | H04N 5/144 348/266 |
| 2014/0307798 A1 | 10/2014 | Taubman et al. | |
| 2015/0256850 A1 | 9/2015 | Kottke et al. | |
| 2018/0052568 A1* | 2/2018 | Angadimani | G06F 3/04842 |
| 2019/0007690 A1* | 1/2019 | Varadarajan | G06K 9/00744 |

FOREIGN PATENT DOCUMENTS

EP    0614312 A2    9/1994

OTHER PUBLICATIONS

Redmon et al.: "You Only Look Once: Unified, Real-Time Object Detection", CVPR 2016.
Hyeonseob Nam et al: "Learning Multi-Domain Convolutional Neural Networks for Visual Tracking", CVPR 2016.
(Continued)

*Primary Examiner* — Obafemi O Sosanya
(74) *Attorney, Agent, or Firm* — EIP US LLP (57) ABSTRACT

A method of processing a video is provided. The method includes detecting a region of interest in a detection frame of the video. The method includes estimating a motion of the region of interest between the detection frame and an estimation frame of the video subsequent to the detection frame. The estimating is based on tracking of a characteristic of the detected region of interest into at least one portion of the estimation frame. The method includes, based on the estimated motion, estimating a location of the region of interest in the estimation frame. An apparatus for processing a video is also provided. A related non-transitory computer-readable storage medium comprising a set of computer-readable instructions is also provided.

20 Claims, 9 Drawing Sheets

(56) References Cited

OTHER PUBLICATIONS

Amr Suleiman et al.: "Towards Closing the Energy Gap Between HOG and CNN Features for Embedded Vision", ISCAS Mar. 17, 2017.
Amr Suleiman et al.: "An Energy-Efficient Hardware Implementation of HOG-based Object Detection at 1080HD 60 fps with Multi-Scale Support", SIPS 2014.
ARM Mali-C71: https://www.arm.com/products/graphics-and-multimedia/mali-camera.
STMicroelectronics STV0991: https://www.st.com/en/imaging-and-photonics-solutions/stv0991.html.
United Kingdom Combined Search and Examination Report dated Jul. 18, 2019 for UK Application No. GB1900684.0.

* cited by examiner

REGION OF INTEREST DETERMINATION IN VIDEO

TECHNICAL FIELD

The present disclosure relates to methods, apparatus and computer-readable media for determining a region of interest in a video.

BACKGROUND

It is frequently desirable to detect a region of interest in a video. For example, the region of interest may correspond to an object in the video. The position or extent of the region of interest may be different in consecutive frames. For example, an object to which the region of interest corresponds may move. It is thus desirable to determine the region of interest on a frame-by-frame basis. In some systems this determining is performed on a real-time basis, as a video is captured. For example, in one such system, the video is captured by a camera of an automated vehicle and regions of interest are determined corresponding to obstacles such as other vehicles. These regions of interest are determined in real time in order to track the current location of surrounding obstacles relative to the vehicle, as the vehicle moves and/or the obstacles move.

Methods of determining a region of interest may be computationally intensive and therefore require significant processing and power resources. This is exacerbated as video resolution and/or frame rate is increased. There is thus a need for more efficient methods of determining a region of interest.

SUMMARY

According to some aspects a method of processing a video is provided. The method includes detecting a region of interest in a detection frame of the video. The method includes estimating a motion of the region of interest between the detection frame and an estimation frame of the video subsequent to the detection frame. The estimating is based on tracking of a characteristic of the detected region of interest into at least one portion of the estimation frame. The method includes, based on the estimated motion, estimating a location of the region of interest in the estimation frame.

According to some other aspects, an apparatus for processing a video is provided. The apparatus includes a detection module configured to detect a region of interest in a detection frame of the video. The apparatus includes a motion estimation module configured to estimate a motion of the region of interest between the detection frame and an estimation frame of the video subsequent to the detection frame. The estimating is based on tracking of a characteristic of the detected region into at least one portion of the estimation frame. The apparatus includes a position estimation module configured to, based on the estimated motion, estimate a location of the region of interest in the estimation frame.

According to some other aspects, a non-transitory computer-readable storage medium comprising a set of computer-readable instructions is provided. When executed by at least one processor, the computer-readable instructions cause the at least one processor to detect a region of interest in a detection frame of the video. When executed by at least one processor, the computer-readable instructions cause the at least one processor to estimate a motion of the region of interest between the detection frame and an estimation frame of the video subsequent to the detection frame, the estimating being based on tracking of a characteristic of the detected region of interest into at least one portion of the estimation frame. When executed by at least one processor, the computer-readable instructions cause the at least one processor to, based on the estimated motion, estimate a location of the region of interest in the estimation frame.

Further features and advantages will become apparent from the following description of preferred embodiments of the disclosure, given by way of example only, which is made with reference to the accompanying drawings.

DETAILED DESCRIPTION

Figure 1:
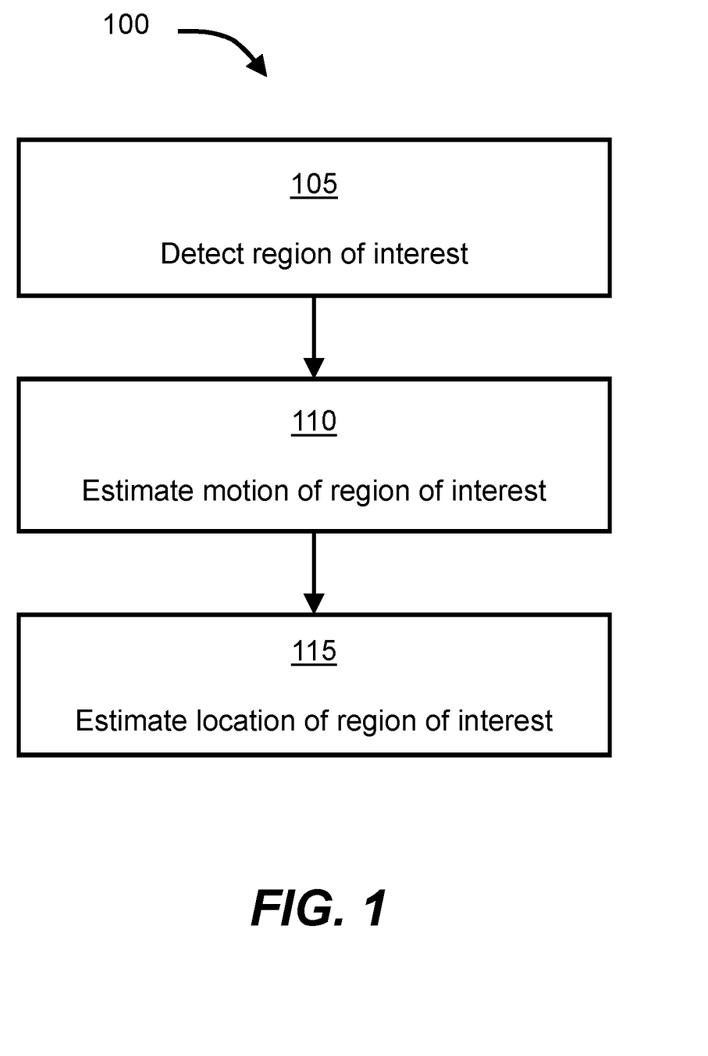
FIG. 1 shows schematically a method of processing a video, according to some example embodiments.

FIG. 1 shows schematically a method 100 of processing a video, according to some example embodiments.

The method 100 comprises a step 105 of detecting a region of interest (ROI) in a single full frame of image data, referred to herein as a detection frame of the video. The region of interest may, for example, correspond to an object in frames of the video. In examples, the step 105 comprises detecting the region of interest using a convolutional neural network applied to a single full frame of image data. An example of a convolutional neural network based method for detecting a region of interest is a method called "You Only Look Once" (YOLO). In other examples, the region of interest is detected using a histogram of oriented gradients and/or a support vector machine applied to a single full frame of image data. Methods such as these provide accurate detection of a region of interest but are relatively computationally intensive.

The method 100 comprises a step 110 of estimating a motion of the region of interest between the detection frame and a frame of the video subsequent to the detection frame, referred to herein as an estimation frame. An estimation frame may, for example, be the frame immediately following the detection frame. The estimating is based on tracking of a characteristic of the detected region of interest into at least one portion of the estimation frame, for example, as described in more detail below.

The method 100 comprises a step 115 of, based on the estimated motion, estimating a location of the region of interest in the estimation frame. This estimating requires significantly less processing and power resources than the full detection that is performed in step 105. The method 100 can thus provide a frame-by-frame location of the region of interest with significantly greater efficiency, in terms of processing and power resources, than methods in which the full detection is performed on each frame.

The method 100 can thus be implemented to reduce the power consumption of object tracking in video with a given frame rate. As another example, the method 100 can be implemented to allow an increased video frame rate without increasing the power consumption.

Figure 2:
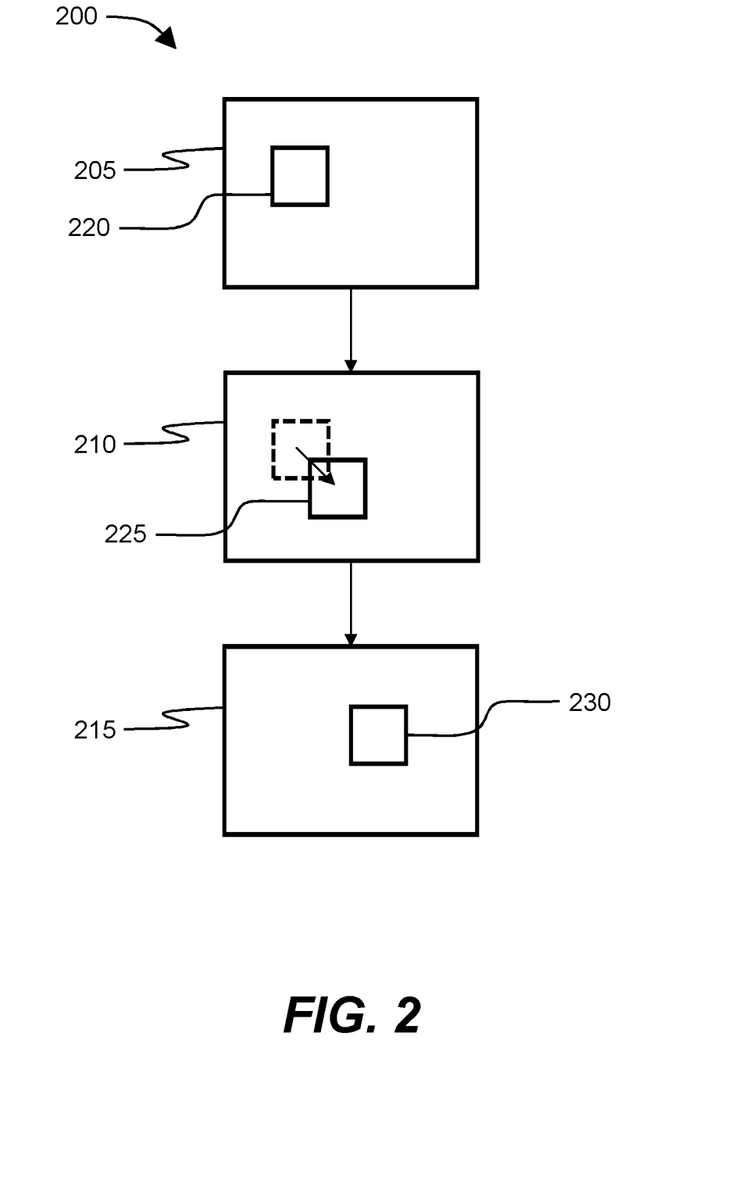
FIG. 2 shows schematically a series of frames of a video, according to some example embodiments.

FIG. 2 shows schematically a series of frames 200 of a video, comprising frames 205, 210 and 215, according to some example embodiments.

Frame 205 is a detection frame. A region of interest 220 is detected in the detection frame 205, for example, by way of a computationally intensive object detection algorithm such as a convolutional neural network as described above.

Frame 210, subsequent to frame 205, is an estimation frame. The previous location of the region of interest (i.e. its position in the detection frame 205) is shown with dotted lines. The motion of the region of interest is estimated, for example, as described in more detail below. As stated above, the estimation is based on tracking of a characteristic of the detected region of interest into at least one portion of the estimation frame 210. The result of this tracking, i.e. the estimated motion, is shown as an arrow in the estimation frame 210.

Based on the estimated motion, a location 225 is estimated for the region of interest. In this manner, a location of the region of interest in the estimation frame 210 is determined without using the full object detection algorithm.

The estimation frame 210 is followed by a further detection frame 215. The region of interest is detected in the detection frame 215, using the full object detection algorithm, to have a location 230. Alternating detection frames and estimation frames in this manner reduces the processing and power resources required to track the region of interest, whilst still providing a high level of accuracy.

In some examples, there is more than one estimation frame between each detection frame. In one such example, for each said further estimation frame, the estimating of the motion of the region of interest is based on further estimation, namely tracking of a characteristic of the detected region of interest into at least one portion of the further estimation frame. Based on the estimated motion between the previous estimation frame and the further estimation frame, a location of the region of interest in the further estimation frame is estimated. The position of the region of interest in each further estimation frame can thus be determined based on the previous estimation frame.

In some examples, the at least one further estimation frame comprises a predetermined number of estimation frames. The number of estimation frames intermediate between each detection frame may be determined in a trade-off between accuracy and required processing and power resources. For example, the number may be variable between 2 and 32 frames based on user preferences.

In other examples, the at least one further estimation frame comprises a dynamically varying number of intermediate estimation frames. The method may, for example, comprise determining a confidence level of the estimating of the motion between the initial estimation frame and the at least one further estimation frame. The at least one further estimation frame then comprises a number of estimation frames which is limited based on the determined confidence level between estimation frames. For example, a confidence value may be determined for the estimation of the motion of the region of interest. In some examples this confidence value will initially be relatively high, because a small number of frames have elapsed since the most recent detection frame. The confidence value will then deteriorate from frame to frame. When the confidence level is low, for example, when it falls below a predefined threshold, the frame is set as a detection frame and the full region of interest detection is performed. In one example, the confidence level is determined based on the Sum of Absolute Difference between a portion in an estimation frame and its matched portion in the previous frame. A higher Sum of Absolute Difference value indicates a lower confidence in the estimation of the motion.

The number of estimation frames intermediate between two detection frames can, in some examples, be determined by a mode setting for the region of interest detection system. The mode setting may be switched automatically, depending on analysis of the video content. For example, when only slow-moving regions of interest are detected or no regions of interest are detected, a mode setting which includes a relatively large number of intermediate estimation frames can be used. Alternatively, the mode setting may be switched manually, for example, based on user input.

In some examples, the aforementioned portions of the estimation frame each comprise one of a predefined grid of portions. One such example will now be described with reference to FIGS. 3A-3C.

Figure 3A:
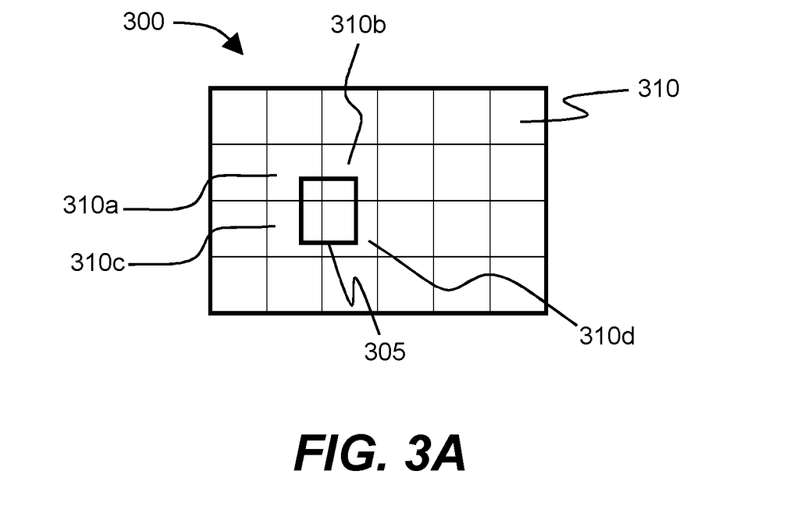
FIGS. 3A-3C illustrate a method, according to some example embodiments.

FIG. 3A shows schematically a detection frame 300, according to some example embodiments. A region of interest 305 has been detected in the detection frame 300, for example, by way of a convolutional neural network, such as YOLO, applied to a full frame of image data, as described above.

The detection frame 300 is divided into a grid of portions 310. This grid is predefined, such that each frame of the video can be said to be divided into the same grid. For example, the portions 310 may have dimensions of 16×16 pixels. The region of interest 305 overlaps portions 310a, 310b, 310c, 310d of the detection frame.

Figure 3B:
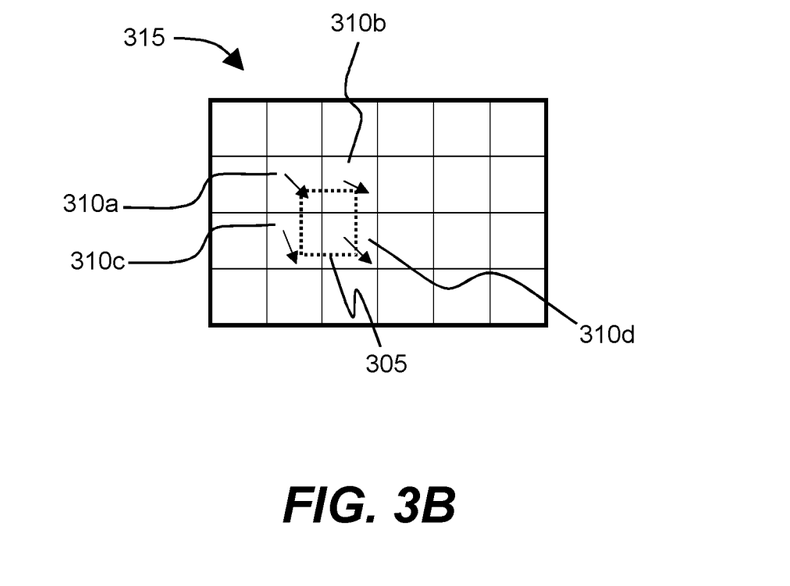

FIG. 3B shows schematically an estimation frame 315, according to some example embodiments, which may, for example, be the frame immediately following the detection frame 300. The region of interest 305 is not detected in the estimation frame using a direction algorithm applied to the full frame of image data, but is estimated based on motion estimation. Its previously detected location (in the detection frame 300) is shown with a dotted line.

Motion vectors, shown as arrows, are determined for each portion 310a, 310b, 310c, 310d of the estimation frame 315 that were overlapped by the region of interest 305 in the detection frame. These motion vectors thus represent the motion associated with portions of the estimation frame 315 that overlap the region of interest 305, and thereby approximate the motion of the region of interest. As noted above in relation to FIG. 1, the method comprises tracking a characteristic of the region of interest 305 into portions of the estimation frame 315. In the present example, these portions are the portions 310a, 310b, 310c, 310d which the region of interest 305 overlaps.

In some examples, the motion vector of a given portion of the estimation frame 315 is determined based on the portion of the detection frame 300 that corresponds most closely to the given portion of the estimation frame 315. For example, the motion vector may be expressed as an x, y offset from the portion in the estimation frame 315 to the most closely matched portion in the detection frame 300. In examples, the most closely matched portion is determined by way of a block matching algorithm between the given portion of the estimation frame 315 and a corresponding portion of the detection frame 300. The block matching operation may, for example, operate in the same manner as a block matching algorithm that forms part of a video compression algorithm. In order to improve the speed of the block matching, in some examples the block matching is performed only in the luma domain and thus does not take into account chroma data. The speed of such a block matching operation does not depend on the portion size.

In some examples, motion vectors are determined for each portion of the estimation frame 315. For example, the motion vectors may also be used for other operations such as temporal denoising and video encoding. In other examples, the motion vectors are determined specifically for the present method. In some such examples, motion vectors are only determined for the portions 310a, 310b, 310c, 310d.

Figure 3C:
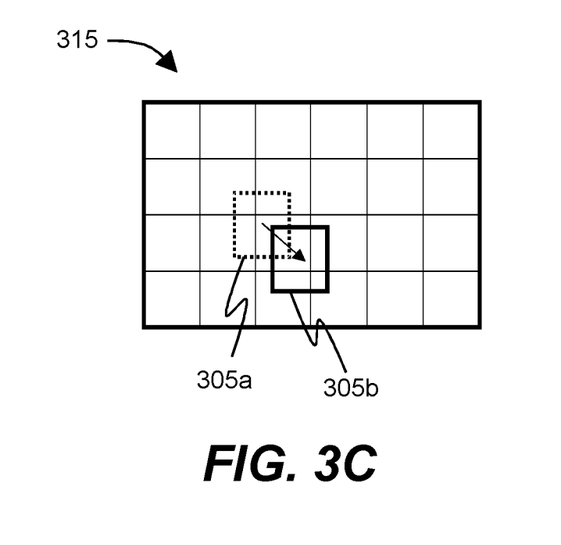

FIG. 3C shows schematically the estimated motion of the region of interest between its position in the detection frame 300, shown with dotted lines 305a, and its position in the estimation frame 315, shown with a solid line 305b, according to some example embodiments. The motion is shown as an arrow. For example, the motion may be an average of the motion vectors of portions 310a, 310b, 310c, 310d shown in FIG. 3B. In some examples, the method comprises determining a contribution of a given portion to the estimating of the motion of the region of interest. This determining is based on an amount of the overlap between the detected region of interest and the given portion. For example, the overall motion of the region of interest 305 may be estimated as a weighted average of the motion vectors associated with portions 310, 310b, 310c, 310d, such that portions such as 310d, which have a greater overlap with the region of interest 305, are assigned a higher weight than portions such as 310a, which have a lesser overlap with the region of interest 305. This improves the accuracy of the estimation of the motion of the region of interest.

In some examples, the method is performed within a video capture pipeline of a video capture system, for example, as described in more detail below. This allows the detected regions of interest to be encoded into the detection frames, and the estimated regions of interest to be encoded into the estimation frames. For example, the position of the region of interest in the detection frame may be stored as metadata associated with the detection frame. Similarly, the estimated position of the region of interest in the estimation frame may be stored as metadata associated with the estimation frame. In some examples, this is stored such that there is no indication of whether a particular frame is a detection frame or an estimation frame. In such examples, there is no additional metadata stored compared with systems in which the full detection is performed on each frame. Methods of the present disclosure may thus be implemented "transparently", such that there is no change to the output metadata. In this manner, the present methods can be implemented without requiring changes to downstream methods that are based on the regions of interest.

Figure 4:
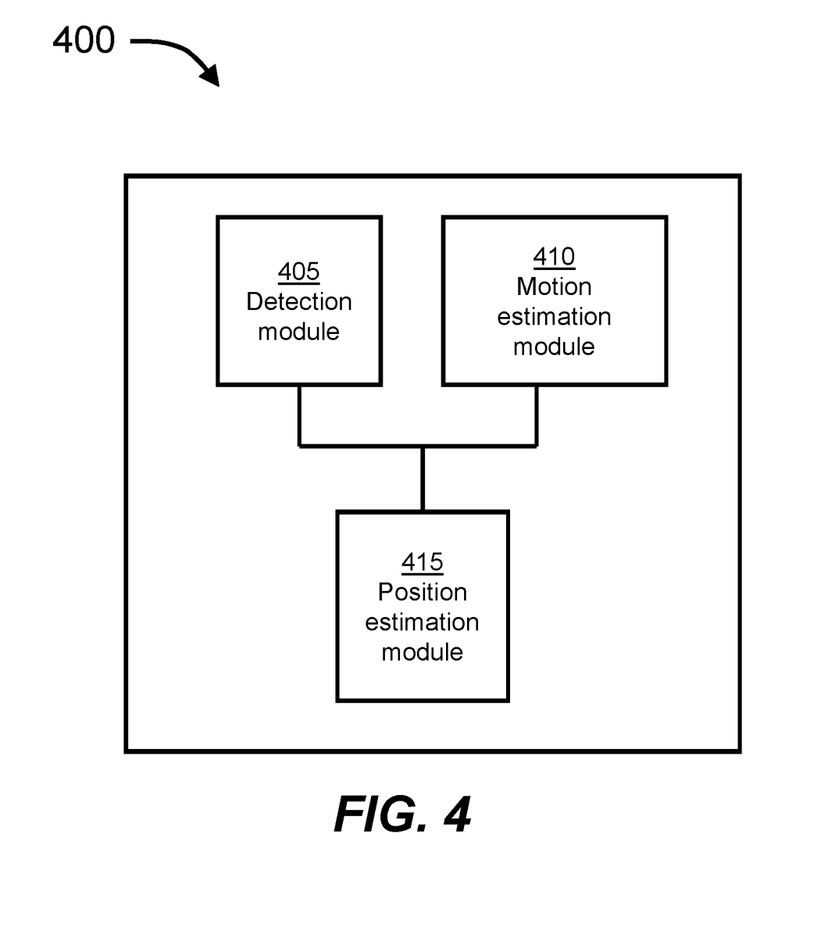
FIG. 4 shows schematically an apparatus for processing a video, according to some example embodiments.

FIG. 4 shows schematically an apparatus 400 for processing a video, according to some example embodiments.

The apparatus 400 comprises a detection module 405 configured to detect a region of interest in a detection frame of the video.

The apparatus 400 comprises a motion estimation module 410 configured to estimate a motion of the region of interest between the detection frame and an estimation frame of the video subsequent to the detection frame. The estimating is based on tracking of a characteristic of the detected region into at least one portion of the estimation frame.

The apparatus 400 comprises a position estimation module 415 configured to, based on the estimated motion, estimate a location of the region of interest in the estimation frame.

The apparatus 400 is thus configured to perform the methods that are described in more detail above.

In some examples, the apparatus 400 comprises a video capture system, for example, including a video camera, configured to capture the video and supply the video to the detection module. The region of interest may thus be determined in real time on a frame-by-frame basis, as the video is captured.

Figure 5:
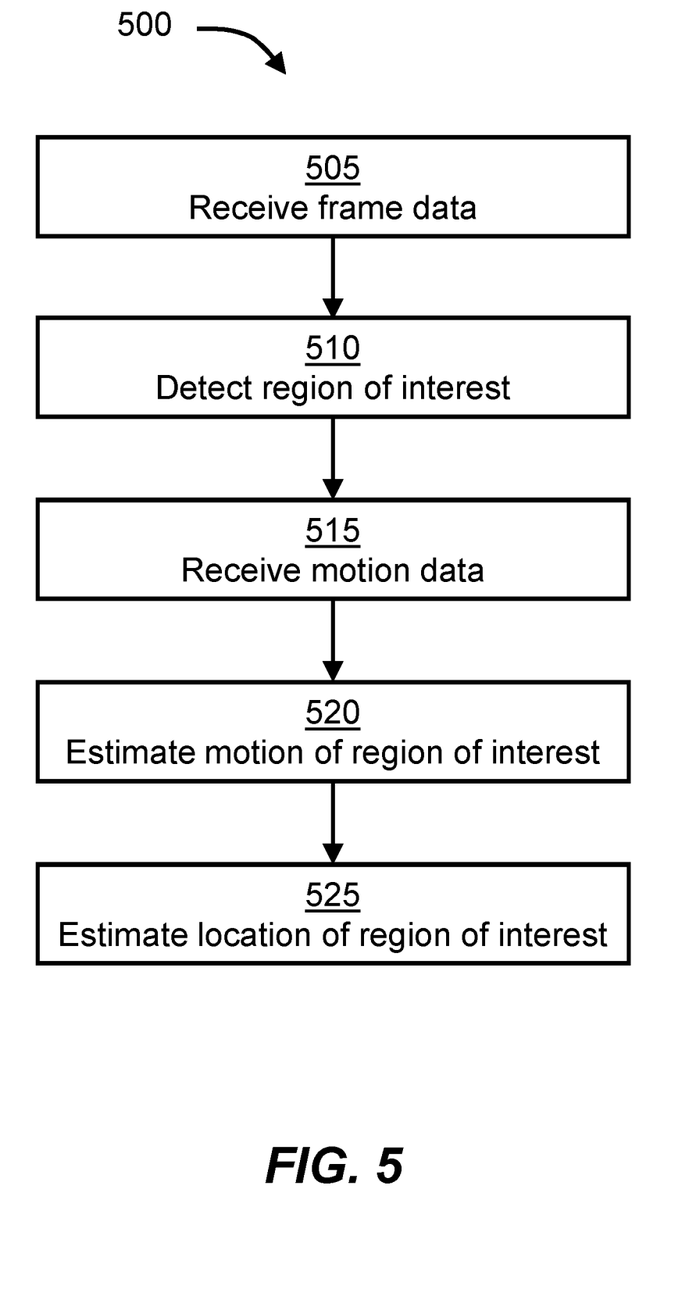
FIG. 5 shows schematically a method, according to some example embodiments.

FIG. 5 shows schematically a method 500, according to some example embodiments.

The method 500 comprises a step 505 of receiving frame data, in this example a full frame of image data, of a detection frame of the video.

The method 500 comprises a step 510 of, processing the frame data, in this example a full frame of image data, to detect a region of interest in the detection frame.

The method 500 comprises a step 515 of receiving motion data, and not receiving frame data, in this example not receiving a full frame of image data, of an estimation frame of the video. The motion data is indicative of motion vectors associated with respective portions of the estimation frame.

The method 500 comprises a step 520 of processing the motion data, in this example not processing a full frame of image data, to estimate a motion of the region of interest between the detection frame and the estimation frame.

The method 500 comprises a step 525 of, based on the estimated motion, estimating a location of the region of interest in the estimation frame.

The method 500 thus, in addition to providing efficient determination of a region of interest, reduces the amount of data traffic by only retrieving motion data, and not frame data, for an estimation frame.

Figure 6:
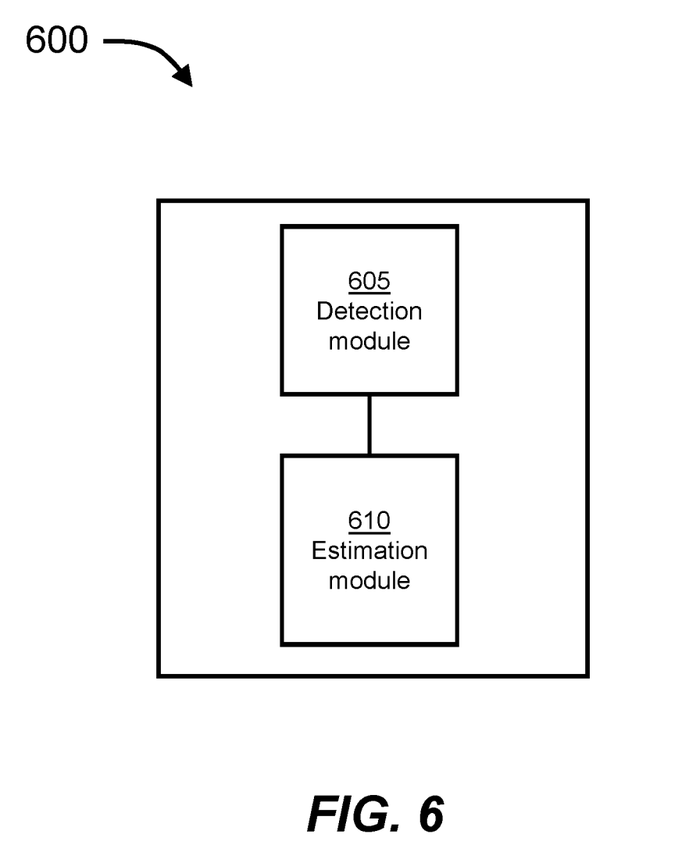
FIG. 6 shows schematically an apparatus for implementing methods such as the method of FIG. 5, according to some example embodiments.

FIG. 6 shows schematically an apparatus 600 for implementing methods such as the method 500 of FIG. 5, according to some example embodiments The apparatus 600 comprises a detection module 605. The detection module 605 is configured to receive frame data of a detection frame of the video and, based on the frame data, detect a region of interest in the detection frame.

The apparatus 600 comprises an estimation module 610. The estimation module 610 is configured to process motion data, and not to process frame data, in this example not to process a full frame of image data, of an estimation frame of the video, wherein the motion data is indicative of motion vectors associated with respective portions of the estimation frame.

The estimation module 610 is configured to, based on the motion data, estimate a motion of the region of interest between the detection frame and the estimation frame.

The estimation module 610 is configured to, based on the estimated motion, estimate a location of the region of interest in the estimation frame.

Figure 7:
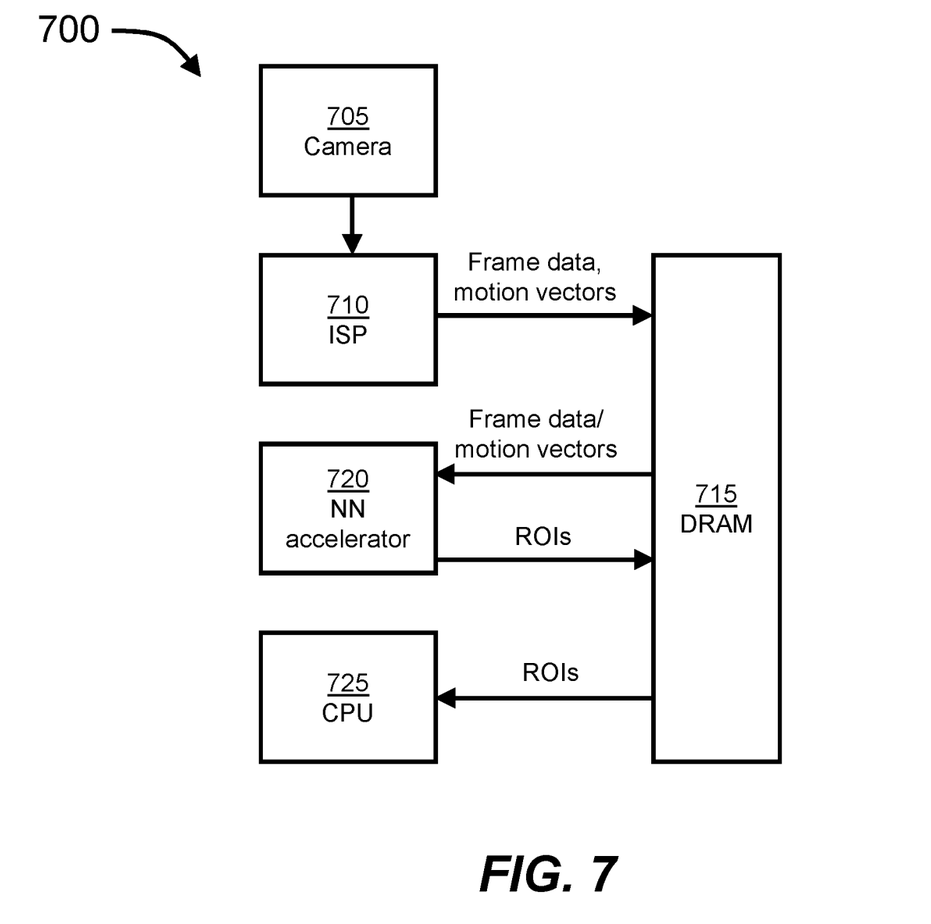
FIG. 7 shows schematically an apparatus for implementing a video processing pipeline, according to some example embodiments.

FIG. 7 shows schematically an apparatus 700 for implementing a video processing pipeline, according to some example embodiments. For example, the apparatus 700 may be used to implement the method 500 of FIG. 5.

The apparatus 700 comprises a camera 705 for capturing video data. The captured video data is transmitted to an image signal processor (ISP) 710, which assembles the received video data into frames. The image signal processor 710 may, for example, be an ARM Mali-C71 or an STMicroelectronics STV0991. The assembling of the video frames may comprise performing processes such as demosaicing, noise reduction and sharpening. The image signal processor 710 also produces motion vectors for portions of each frame, for example, as described in more detail above. The motion vectors may, for example, be stored as metadata associated with each frame.

The image signal processor 710 stores the video frame data in the form of full frames of image data, and the motion vectors in a dynamic random-access memory (DRAM) 715.

For a detection frame, the video frame data is retrieved from the DRAM 715 by a neural network (NN) accelerator 720. The neural network accelerator 720 detects regions of interest in the detection frame by way of a convolutional neural network, and stores data describing the detected regions of interest in the DRAM 715. The neural network accelerator 720 thus acts as the detection module 605 described above in relation to FIG. 6.

For an estimation frame, the neural network accelerator 720 retrieves the motion vectors but not the full video frame data. The neural network accelerator 720 estimates a location of the region of interest in the estimation frame, without applying neural network processing to the video frame itself, for example, by implementing the methods described in more detail above. The neural network accelerator 720 thus acts as the estimation module 610 described above in relation to FIG. 6. In other examples, the neural network accelerator 720 acts only as the detection module 605 and a different system component acts as the estimation module 610.

The neural network accelerator 720 stores data describing the estimated regions of interest in the DRAM 715. There is thus significantly less traffic between the DRAM 715 and the neural network accelerator 720 than in systems in which the neural network accelerator 720 retrieves the full video frame data for each frame. For example, for a 1080p video with a portion size of 16×16 pixels, each frame will have 8100 motion vectors. If the motion in one direction is restricted to 7 pixels, each motion vector can be encoded in one byte. 8100 bytes are thus required to transmit the motion vectors of the entire frame. For a frame rate of 60 frames per second, a bandwidth of 486 kilobytes per second is therefore required to transmit the motion vectors. This is very small compared with the bandwidth that is available to a DRAM, which is typically of the order of gigabytes per second.

The apparatus 700 comprises a central processing unit (CPU) 725 which retrieves the data describing the regions of interest from the DRAM 715. The CPU 725 then performs methods based on the regions of interest. For example, where the apparatus 700 is implemented within an automated vehicle and the regions of interest correspond to objects around the vehicle, the CPU 725 may maneuver the vehicle to avoid the objects.

In some examples, the estimation of the region of interest in estimation frames is performed by the CPU 725, rather than in the neural network accelerator 720. In some examples this reduces traffic to and from the DRAM 715, in particular in examples in which the CPU 725 will receive and process the region of interest from every frame. Furthermore, the estimation of the region of interest is, in some examples, computationally fast enough to be efficiently handled by the CPU 725, and can also be accelerated, for example, using Neon/SVE ISA extensions. Additionally, performing the estimation in the CPU 725 may provide more flexibility for later updating the estimation method.

Figure 8:
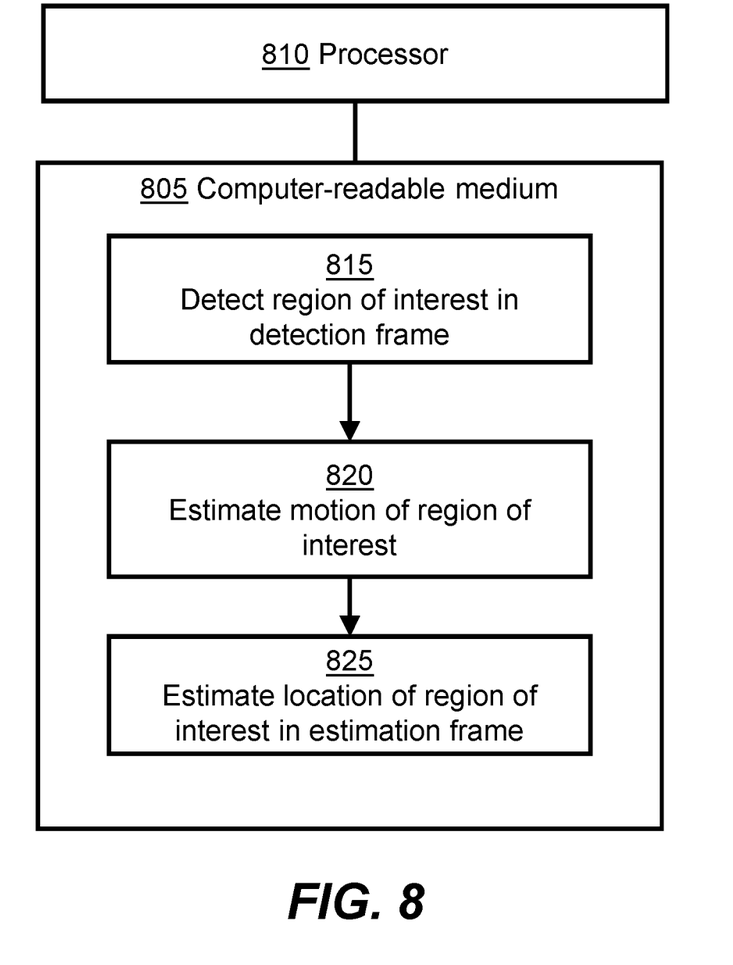
FIG. 8 shows schematically a non-transitory computer-readable storage medium, according to some example embodiments.

FIG. 8 shows an example of a non-transitory computer-readable storage medium 805 comprising a set of computer-readable instructions which, when executed by at least one processor 810, cause the at least one processor 810 to perform a method, according to some example embodiments. The computer-readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

At block 815, the instructions cause the processor 810 to detect a region of interest in a detection frame of the video.

At block 820, the instructions cause the processor 810 to estimate a motion of the region of interest between the detection frame and an estimation frame of the video subsequent to the detection frame. The estimating is based on tracking of a characteristic of the detected region of interest into at least one portion of the estimation frame.

At block 825, the instructions cause the processor 810 to, based on the estimated motion, estimate a location of the region of interest in the estimation frame.

The above embodiments are to be understood as illustrative examples of the disclosure. Further embodiments of the disclosure are envisaged. For example, it is described that the method may be implemented within an automated vehicle. In other examples, the method is implemented within a surveillance camera, to track objects captured by the surveillance camera. As a further example, the method may be implemented within a virtual reality or augmented reality system, for example, to track objects and display associated information. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method of processing a video, the method comprising:
   detecting a region of interest in a detection frame of the video;
   estimating a motion of the region of interest across a plurality of frames comprising the detection frame and at least one estimation frame of the video subsequent to the detection frame, wherein, for each of the at least one estimation frame, the estimating is based on tracking of a characteristic of the detected region of interest into at least one portion of the estimation frame;
   determining a confidence level of the estimating the motion of the region of interest between at least one pair of frames of the plurality of frames, wherein the at least one estimation frame comprises a number of estimation frames determined based on the confidence level; and
   based on the estimated motion, estimating a location of the region of interest in the at least one estimation frame.

2. The method according to claim 1, comprising estimating a motion of the region of interest between a first estimation frame of the at least one estimation frame and at least one further estimation frame of the at least one estimation frame subsequent to the first estimation frame, wherein:
  for each further estimation frame, the estimating is based on tracking of a characteristic of the detected region of interest into at least one portion of the further estimation frame; and
  based on the estimated motion between the first estimation frame and the at least one further estimation frame, estimating a location of the region of interest in the at least one further estimation frame.

3. The method according to claim 2, comprising determining the confidence level of the estimating of the motion of the region of interest between the first estimation frame and the at least one further estimation frame.

4. The method according to claim 1, comprising detecting the region of interest in the detection frame using a convolutional neural network.

5. The method according to claim 1, wherein the region of interest corresponds to an object in frames of the video.

6. The method according to claim 1, wherein, for an estimation frame of the at least one estimation frame, each portion of the at least one portion of the estimation frame comprises one of a predefined grid of portions.

7. The method according to claim 6, wherein the detected region of interest overlaps each at least one portion of the predefined grid of portions.

8. The method according to claim 7, comprising determining a contribution of the tracking into a given portion, of the at least one portion, to the estimating of the motion of the region of interest, wherein:
  the determining is based on an amount of the overlap between the detected region of interest and the given portion.

9. The method according to claim 1, comprising determining the motion associated with the at least one portion of an estimation frame of the at least one estimation frame, wherein the tracking of the characteristic of the detected region of interest comprises performing a block matching operation between:
  the given portion of the estimation frame; and
  a corresponding portion of the detection frame.

10. The method according to claim 1, the method being performed within a video capture pipeline of a video capture system.

11. The method according to claim 1, comprising:
  storing a position of the region of interest in the detection frame as metadata associated with the detection frame; and
  storing the estimated position of the region of interest in an estimation frame of the at least one estimation frame as metadata associated with the estimation frame.

12. An apparatus for processing a video, the apparatus comprising:
  a detection module configured to detect a region of interest in a detection frame of the video;
  a motion estimation module configured to:
    estimate a motion of the region of interest across a plurality of frames comprising the detection frame and at least one estimation frame of the video subsequent to the detection frame, wherein, for each of the at least one estimation frame, the estimating is based on tracking of a characteristic of the detected region of interest into at least one portion of the estimation frame; and
    determine a confidence level of the estimating the motion of the region of interest between at least one pair of frames of the plurality of frames, wherein the at least one estimation frame comprises a number of estimation frames determined based on the confidence level; and
  a position estimation module configured to:
    based on the estimated motion between the detection frame and the estimation frame, estimate a location of the region of interest in the at least one estimation frame.

13. The apparatus according to claim 12, comprising a video capture system configured to capture the video and supply the video to the detection module.

14. A non-transitory, computer-readable storage medium comprising a set of computer-readable instructions which, when executed by at least one processor, cause the at least one processor to:
  detect a region of interest in a detection frame of the video;
  estimate a motion of the region of interest across a plurality of frames comprising the detection frame and at least one estimation frame of the video subsequent to the detection frame, wherein, for each of the at least one estimation frame, the estimating is based on tracking of a characteristic of the detected region of interest into at least one portion of the estimation frame;
  determine a confidence level of the estimating the motion of the region of interest between at least one pair of frames of the plurality of frames, wherein the at least one estimation frame comprises a number of estimation frames determined based on the confidence level; and
  based on the estimated motion, estimate a location of the region of interest in the at least one estimation frame.

15. The non-transitory, computer-readable storage medium of claim 14, wherein the set of computer-readable instructions, when executed by the at least one processor, further cause the at least one processor to:
  estimate a motion of the region of interest between a first estimation frame of the at least one estimation frame and at least one further estimation frame of the at least one estimation frame subsequent to the first estimation frame, wherein:
    for each further estimation frame, the estimating is based on tracking of a characteristic of the detected region of interest into at least one portion of the further estimation frame; and
    based on the estimated motion between the first estimation frame and the at least one further estimation frame, estimate a location of the region of interest in the at least one further estimation frame.

16. The non-transitory, computer-readable storage medium of claim 15, wherein the set of computer-readable instructions, when executed by the at least one processor, further cause the at least one processor to:
  determine the confidence level of the estimating of the motion of the region of interest between the first estimation frame and the at least one further estimation frame.

17. The non-transitory, computer-readable storage medium of claim 14, wherein the set of computer-readable instructions, when executed by the at least one processor, further cause the at least one processor to:
  detect the region of interest in the detection frame using a convolutional neural network.

18. The non-transitory, computer-readable storage medium of claim 14, wherein the region of interest corresponds to an object in frames of the video.

19. The apparatus according to claim 12, comprising a neural network accelerator configured to implement at least one of: the detection module, or the detection module and the estimation module.

20. The apparatus according to claim 19, wherein, to estimate the location of the region of interest in an estimation frame of the at least one estimation frame, the neural network accelerator is configured to obtain motion data representative of the estimate of the motion of the region of interest between the detection frame and the estimation frame without obtaining video frame data representative of the estimation frame.

* * * * *